US011432456B2

(12) United States Patent
Donadon et al.

(10) Patent No.: US 11,432,456 B2
(45) Date of Patent: Sep. 6, 2022

(54) PRECISION PNEUMATIC SEED DRILL AND METHOD OF REGULATING SAME

(71) Applicant: Maschio Gaspardo S.p.A., Campodarsego (IT)

(72) Inventors: Gianfranco Donadon, Concordia Sagittaria (IT); Luigi Giovanni Bot, Portogruaro (IT); Bruno Miolo, Concordia Sagittaria (IT)

(73) Assignee: Maschio Gaspardo S.p.A, Campodarsego (IT)

( * ) Notice: Subject to any disclaimer, the term of this patent is extended or adjusted under 35 U.S.C. 154(b) by 253 days.

(21) Appl. No.: 16/762,735

(22) PCT Filed: Nov. 9, 2018

(86) PCT No.: PCT/IB2018/058827
§ 371 (c)(1),
(2) Date: May 8, 2020

(87) PCT Pub. No.: WO2019/092649
PCT Pub. Date: May 16, 2019

(65) Prior Publication Data
US 2020/0359551 A1     Nov. 19, 2020

(30) Foreign Application Priority Data

Nov. 10, 2017   (IT) .................. 102017000128764

(51) Int. Cl.
*A01C 7/04*     (2006.01)
*A01C 5/06*     (2006.01)
(Continued)

(52) U.S. Cl.
CPC .............. *A01C 7/042* (2013.01); *A01C 7/046* (2013.01); *A01C 5/064* (2013.01); *A01C 7/082* (2013.01); *A01C 7/20* (2013.01)

(58) Field of Classification Search
CPC ......... A01C 7/042; A01C 5/064; A01C 7/046; A01C 7/082; A01C 7/20; A01C 7/04;
(Continued)

(56) References Cited

U.S. PATENT DOCUMENTS

| 4,899,672 A | 2/1990 | Paul |
| 2014/0182495 A1 | 7/2014 | Wendte et al. |

FOREIGN PATENT DOCUMENTS

| DE | 102016204453 | 9/2017 |
| EP | 0266722 | 5/1988 |

(Continued)

OTHER PUBLICATIONS

International Search Report and Written Opinion dated Mar. 6, 2019 for PCT Application PCT/IB2018/058827.

*Primary Examiner* — Christopher J. Novosad
(74) *Attorney, Agent, or Firm* — Stradley Ronon Stevens & Young, LLP

(57) ABSTRACT

A precision pneumatic seed drill. The seed drill comprises at least one sowing element having a seed selector device housing a perforated selector disc which selects seed and has opposing faces subject to a pressure differential. A sowing duct is associated with the selector device. A system measures the speed of forward movement of the seed drill with reference to the ground being sown in order to vary the rotational speed of the selector disc according to the speed of forward movement measured by the measuring system. A pressurization device associated with the selector disc applies the pressure differential to the faces. An ejector along the sowing duct is fed by a compressed air dispenser for pneumatically accelerating the seeds singled out by the selector device. A device for varying the pressure of compressed air fed to the ejector is calibrated according to the typology of the seed to be sown.

20 Claims, 3 Drawing Sheets

(51) Int. Cl.
*A01C 7/08* (2006.01)
*A01C 7/20* (2006.01)

(58) Field of Classification Search
CPC .. A01C 7/00; A01C 5/062; A01C 5/06; A01C 5/00; A01C 7/044; A01C 7/081; A01C 7/08
See application file for complete search history.

(56) References Cited

FOREIGN PATENT DOCUMENTS

| | | |
|---|---|---|
| EP | 2702849 | 3/2014 |
| WO | 2005011358 | 2/2005 |
| WO | 2017182998 | 10/2017 |

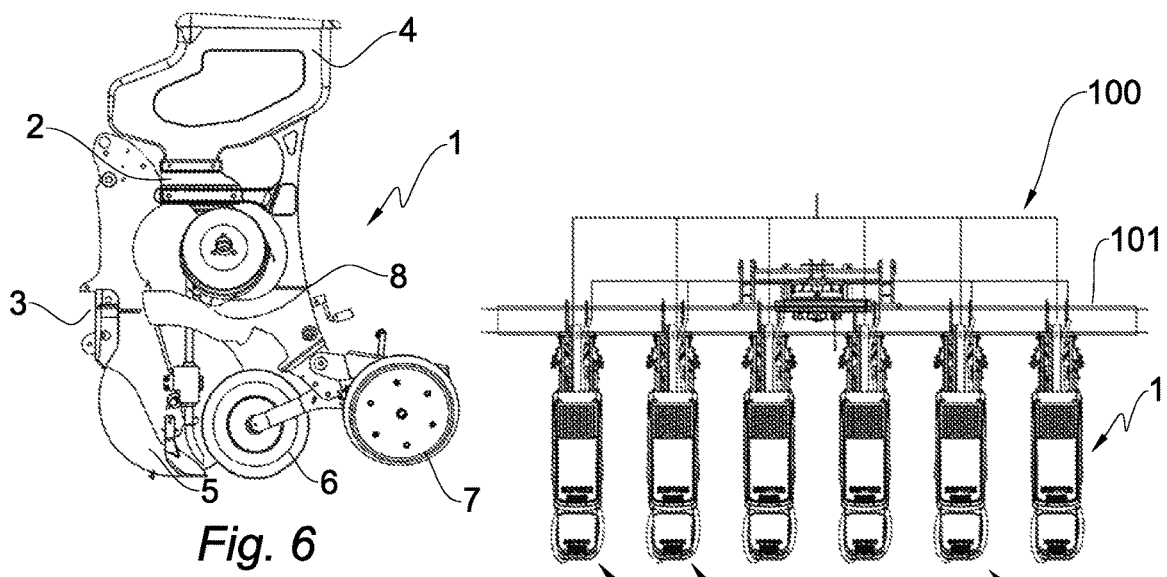
Fig. 6
Fig. 1
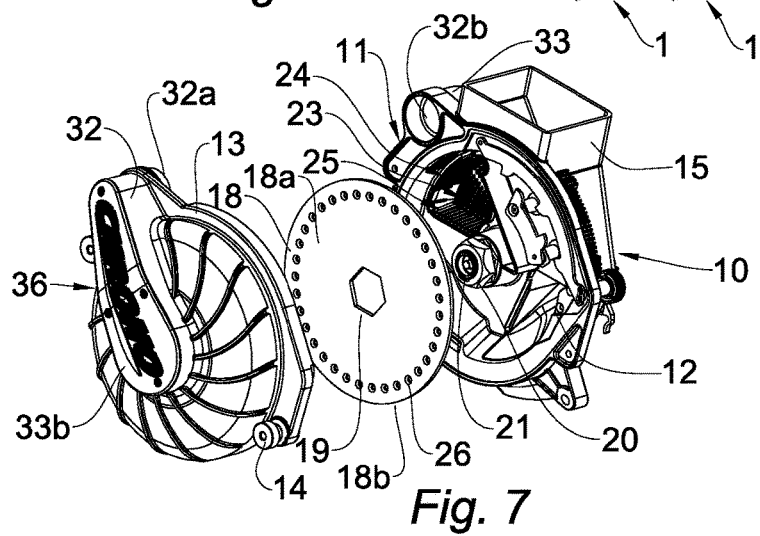
Fig. 7
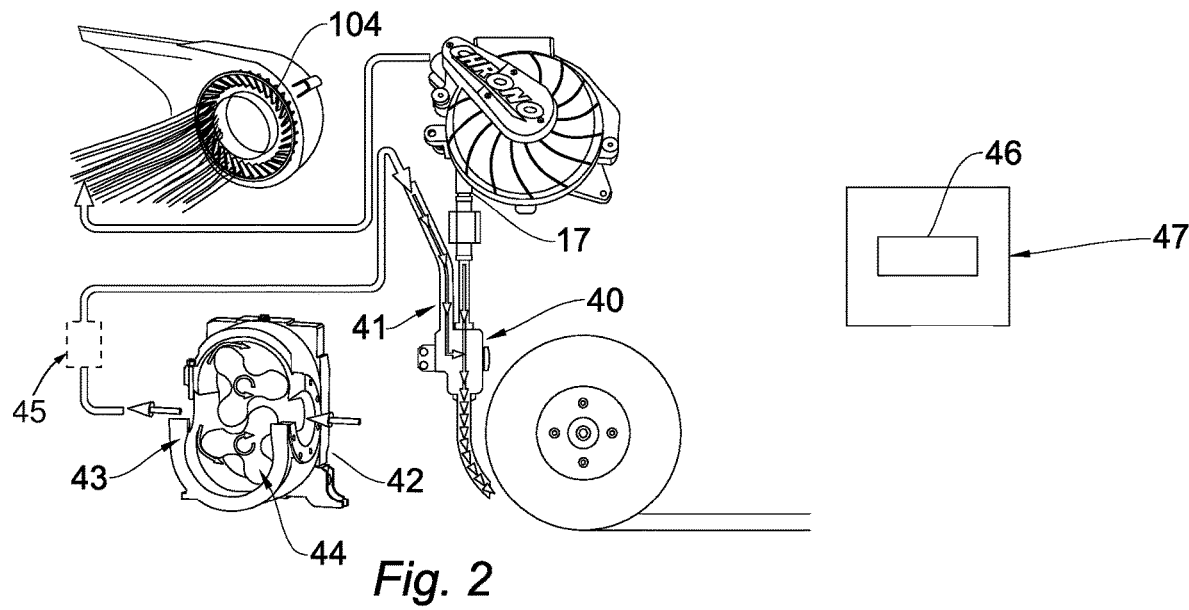
Fig. 2

PRECISION PNEUMATIC SEED DRILL AND METHOD OF REGULATING SAME

CROSS REFERENCE TO RELATED APPLICATIONS

This application is a U.S. National Phase filing of International Patent Application No. PCT/IB2018/058827 filed on Nov. 9, 2018, which claims the priority of Italian Patent Application No. 102017000128764 filed on Nov. 10, 2017. The disclosures of these applications are hereby incorporated by reference in their entirety

DESCRIPTION

Technical Field

The present invention relates to a precision pneumatic seed drill and to a method of regulating same.

Technological Background

The use of precision agricultural seed drills in which the seed is selected and singled out pneumatically by a perforated disc seed selector, the opposing faces of which are subject to a pressure differential, is widespread. In the majority of cases, the selector disc is housed in a box shaped casing and divides the inside of the casing into two distinct regions. A chamber for drawing the seed is defined in a first region, which chamber is maintained at atmospheric pressure by an opening made in the casing. The second region is subjected to a vacuum by connecting the region to the aspiration inlet of a powerful centrifugal fan. In so doing, the air drawn from the first region towards the second region through the holes of the selector disc ensures that a seed adheres at each hole in order to then be deposited in a sowing duct and, from there, into the ground.

EP2702849 discloses a seed drill of the aforementioned type which is provided with an ejector arranged in the sowing duct in order to accelerate the fall speed of the seed or to use the simple fall by gravity, as per the choice of the user. The document also discloses the possibility of regulating the pressure of compressed air fed to the ejector. The document describes these variations as limited to regulating the seed drill according to the moisture level of the ground being sown.

U.S. Patent Application Publication No. 2014/182495 discloses a precision seed drill in, which a funnel is provided that is arranged close to the rotating disc seed distributor. The fall speed of the seed is regulated, in order to neutralize the seed bounce caused by the speed of forward movement of the sowing unit, by varying, inside the distributor, both the positive pressurization on one side of the disc and the negative pressurization on the opposite side.

EP0266722 discloses trapping the seed in an ejector and subsequently "firing" the seed into the sowing furrow using pulses of compressed air.

SUMMARY OF THE DISCLOSURE

However, the invention originates from the observation that other factors can also favorably or negatively influence the regulation of the seed drill and the ways in which compressed air is fed to the ejector, especially in order to increase the sowing speed without hindering the precision of the seed drill.

A problem addressed by the present invention is that of providing a precision pneumatic seed drill and associated regulation method that allow the sowing speed of the seed drill to be increased, without hindering the precision thereof and instead optimizing the obtainable sowing uniformity thereof.

This problem is solved according to the invention by a precision pneumatic seed drill and associated method for regulating same, produced in accordance with the disclosure below. The seed drill comprises at least one sowing element having a seed selector device housing a perforated selector disc which selects seed and has opposing faces subject to a pressure differential. A sowing duct is associated with the selector device. A system measures the speed of forward movement of the seed drill with reference to the ground being sown in order to vary the rotational speed of the selector disc according to the speed of forward movement measured by the measuring system. A pressurization device associated with the selector disc applies the pressure differential to the faces. An ejector along the sowing duct is fed by a compressed air dispenser for pneumatically accelerating the seeds singled out by the selector device. A device for varying the pressure of compressed air fed to the ejector is calibrated according to the typology of the seed to be sown.

It is to be understood that both the foregoing general description and the following detailed description are exemplary, but are not restrictive, of the disclosure.

DESCRIPTION OF THE DRAWINGS

The features and advantages of the invention will become clearer from the following detailed description of embodiments thereof, shown by way of non-restrictive examples and with reference to the accompanying drawings, in which:

FIG. 1 is a schematic view of a seed drill produced in accordance with the invention;

FIG. 2 is a diagram which describes the main steps of the method for regulating the seed drill shown in FIG. 1;

FIG. 6 is a lateral view of the sowing element included in the seed drill shown in FIG. 1; and FIG. 7 is a perspective exploded view of a device for selecting the seed.

DETAILED DESCRIPTION OF EMBODIMENTS

Figure 3:
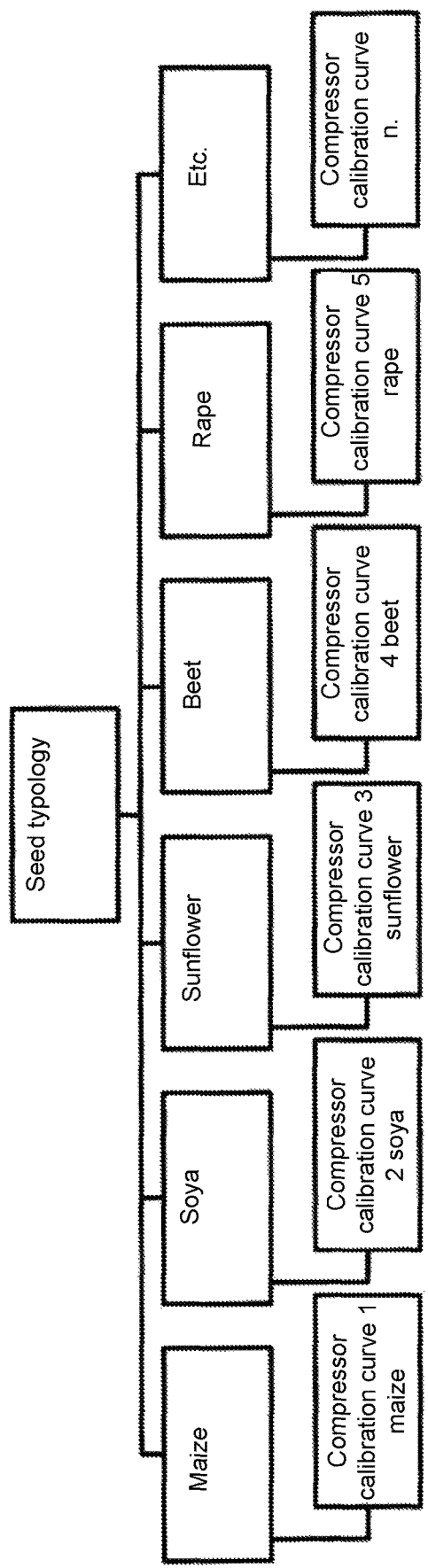
FIGS. 3 to 5 are, respectively, a table and two characteristic calibration curves of the seed drill according to the regulation method of the invention.

In the drawings, reference numeral 1 indicates, as a whole, a sowing element for precision agricultural seed drills. A seed drill of this kind is shown schematically as a whole in FIG. 1, where it is denoted with the reference numeral 100, and comprises, in a manner known per se, a sowing element holding bar 101 to which a plurality of sowing elements 1 are fixed, the sowing elements 1 being spaced apart.

Each sowing element 1 comprises a frame 2; a mount 3, preferably in the shape of an articulated parallelogram, by which the frame 2 of the sowing element 1 is connected to the sowing element holding bar; a tank comprising a hopper 4 for containing the seed; one or more coulters 5, for example disc coulters, for opening a sowing furrow; a pair of wheels 6 for regulating the sowing depth; and a furrow-covering device 7 for closing the furrow opened by the coulters 5 and thereby covering the seed.

The reference numeral 10 indicates, as a whole, a device for selecting the seed, which device is fed by gravity from the hopper 4 and is designed to distribute one seed, at a time at a correct depth and spacing in the sowing furrow. A portion 8 of the frame 2 supports the device 10.

The seed selector device 10 comprises a casing which is formed by a box-shaped body 11 that is fixedly mounted on the frame 2, and a cover 13. The box-shaped body 11 and the cover 13 can be hinged to one another or, more simply, connected by screws 14, the loosening of which allows the cover 13 to be completely taken off the opening over which it rests.

A connector 15 is made in the box-shaped body 11, with which connector 15 the hopper 4, an opening that acts as an air vent, and a seed descent duct 17 engage. A selector disc 18 engages with a driving shaft 21 of an electric motor or other device, preferably via a polygonal coupling 19 and relative hub 20, in order to rotate the selector disc 18 about its own axis.

According to one embodiment of the invention, a measuring system 35, only shown schematically in FIG. 1, is provided for measuring the speed of forward movement of the seed drill 100 with reference to the ground being sown, in order to vary the rotational speed of the selector disc 18 according to the speed of forward movement measured by the measuring system 35.

A chamber 23 for drawing the seed is defined between a bottom 12 of the box-shaped body 11 and the selector disc 18. A shutter 24 arranged downstream of the connector 15 regulates the flow of seeds falling from the hopper 4 into the chamber 23 in order to divide the flow or optionally interrupt it. An inspection door 25 is provided in the lowest part of the chamber 23 so as to allow the chamber 23 to be completely emptied if necessary.

The selector disc 18 is peripherally engaged by one or more crowns of holes 26 that pass between the opposing faces 18a and 18b thereof.

In some embodiments, a pressurized duct of a pressurization device 34 is associated with the selector disc 18 for applying a pressure differential between the two faces 18a and 18b.

The pressurization device 34 preferably includes a pressurized distribution duct 32 which, in some embodiments, extends through a radial rib structure 36, which is for example raised on the cover 13. According to another embodiment of the invention, the duct 32 is partially integrated in the cover 13 and partially extends in the box-shaped body 11, the two parts being joined by a male/female coupling connector 32a and 32b or a connector of another type, for example a flanged connector.

In some embodiments, the part of the duct 32 that is integral with the box-shaped body 11 terminates in a first shell manifold 33 formed on the body 11.

The rib structure 36 is preferably shaped so as to be raised on the cover 13 for a predominant part of the extent thereof.

According to other embodiments, the duct 32 for the part made in the rib structure 36 is integrated into the cover 13 and is closed in turn by a second cover 33b that can be removed for inspection and cleaning. It is noted that the raised position of the rib structure 36 with respect to the cover 13 advantageously forms a handle which allows the cover 13 to be gripped and maneuvered from and towards the body 11 using one hand.

A negative pressure is applied, by the pressurization device 34, in the region defined between the first face 18a of the selector disc 18 and the cover 13, which pressure is less than the atmospheric pressure that is instead established on the other face 18b of the selector disc 18 as a result of the connection between the chamber 23 for drawing the seed and the outside environment. The seeds in the drawing chamber 23 are therefore drawn in at the holes 26 in order to adhere to the corresponding face 18b of the selector disc 18 until, while the disc 18 is rotating, the aspiration is interrupted in a manner known per se, thus causing the seed to fall into the sowing duct 17.

An ejector 40 is arranged in the sowing duct 17, which ejector 40 is fed from the duct 17 and from a compressed air supply 41 that originates from a compressed air dispenser 42, for example a positive displacement blower. The ejector 40 is located in an intermediate region of the sowing duct 17, not close to the seed selector device 10. This position makes it possible to have the seed from one side (upstream of the ejector 40) drawn into the sowing duct 17 and the seed from the other side (downstream of the ejector 40) launched at the desired speed. In one embodiment, the sowing duct 17 comprises at least one straight portion 17a and a curved portion 17b, with the ejector 40 being arranged in a transition region between the portions.

The compressed air dispenser 42 comprises a variable speed compressor. A pressure-varying device 43 varies the pressure of compressed air fed to the ejector 40.

In some embodiments, the compressor is a compressor of which the rotational speed can be varied by the pressure-varying device 43, which comprises a speed-regulating device 44 for regulating the speed of the compressor.

Alternatively, the pressure-varying device 43 for varying the pressure of compressed air fed to the ejector 40 comprises a partitioning valve 45 between the compressed air dispenser 42 and the ejector 40, which valve 45 is used as a regulator for the flow of the ejector 40. The partitioning valve 45 is illustrated in dashed lines in FIG. 2 because the partitioning valve 45 is part of an alternative embodiment to the embodiment otherwise illustrated in FIG. 2.

In any case, it is preferred, although not essential, for the compressed air dispenser 42 to be independent from the system for pressurization of the selector disc 18, the latter generally being formed by a centrifugal fan 104, to the aspiration inlet of which all of the sowing elements 1 are connected.

Figure 4:
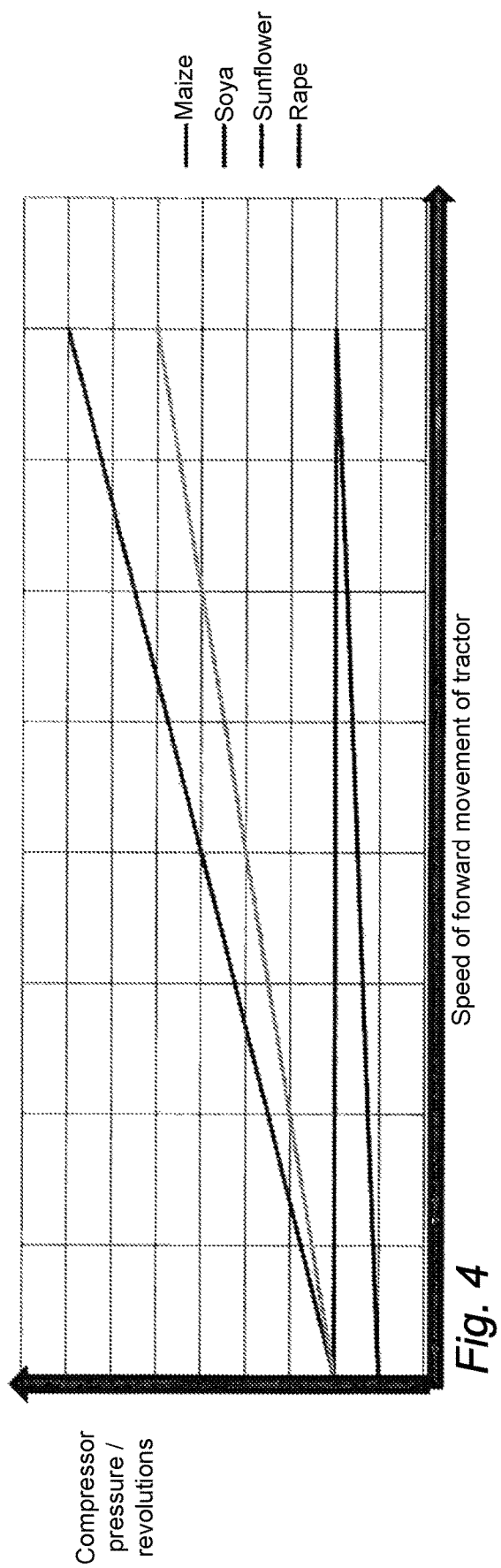
Figure 5:
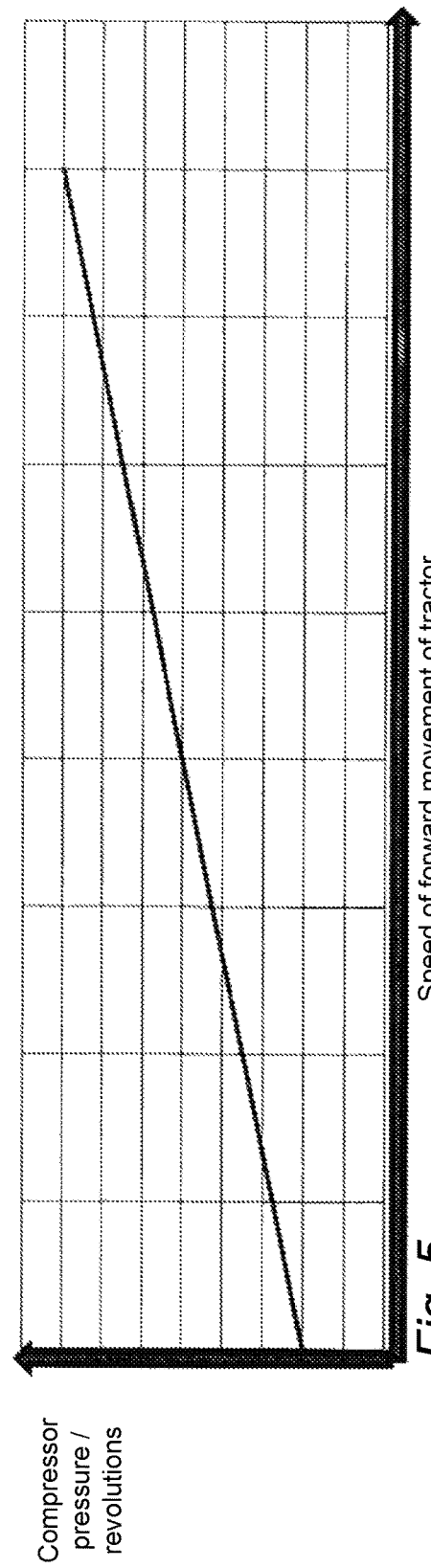

The method for regulating the seed drill 100 includes the steps of preparing at least one calibration curve of the seed drill 100 for varying the pressure according to the typology of the seed to be sown and/or the speed of forward movement of the seed drill 100. The table of FIG. 3 illustrates an example regulation method. Examples of the calibration curves are shown in the graphs in FIGS. 4 and 5, in which the ordinate represents the value of the pressure supplied by the compressed air dispenser 42, optionally correlated to the rotational speed thereof in revolutions per minute, and the abscissa represents the value of the speed of forward movement of the seed drill 100 as positioned in an, agricultural tractor. The calibration curves differ due to the typology of the seed, or the dimensions of the seed and/or the mass of the seed. It will also be appreciated that, in the context of the present invention, the calibration curves can also be shown by a set of single points. In fact, if the curves are defined solely according to the typology of the seed, they will be shown by single calibration values of the pressure-varying device 43, which values are associated with each type of seed.

The pressure-varying device 43 is calibrated manually or automatically during or before the sowing process according to the course described by the desired calibration curve according to the speed of forward movement of the seed drill 100.

Alternatively, the data describing the calibration curves are stored in a storage unit 46 of a computer 47, on which computer 47 the data of pressure supplied to the ejector 40 and the data relating to the speed of forward movement of the seed drill 100 are gathered.

On the basis of this data, which are processed by software contained in the computer 47, it is verified that the speed of forward movement of the seed drill 100 and the pressure supplied to the ejector 40 are adapted to the calibration curve selected for the seed typology distributed.

It is also possible to feed data relating to the sowing ground conditions to the computer 47 in order to also adapt the processing results to this parameter.

In essence, at least the following advantages can be obtained using the regulating method according to the invention:
- guaranteeing the best pneumatic conveyance performance based on the different seed typologies (heavy, light, big, small);
- guaranteeing that the fall speed is not too fast when the speed of forward movement of the seed drill 100 is too slow, which could cause the seeds to spill out of the furrow;
- operating the supply of the ejector 40 separately from the vacuum air supply of the dosing apparatus (This always guarantees that the seed is selected and that it is launched towards the ground at an appropriate speed); and
- calibrating the system according to the ground conditions.

Although illustrated and described above with reference to certain specific embodiments, the present disclosure is nevertheless not intended to be limited to the details shown. Rather, various modifications may be made in the details within the scope and range of equivalents of the claims and without departing from the spirit of the disclosure.

The invention claimed is:

1. A precision pneumatic seed drill for sowing seeds into the ground, the seed drill comprising:
   - at least one sowing element having a seed selector device housing a rotating perforated selector disc which selects the seed and has opposing faces subject to a pressure differential;
   - a sowing duct associated with the seed selector device and having an intermediate region located at a distance from the seed selector device;
   - a pressurization device associated with the selector disc and applying the pressure differential to the opposing faces of the selector disc;
   - a compressed air dispenser for feeding compressed air;
   - an ejector positioned in the intermediate region of and fed by the sowing duct and fed compressed air by the compressed air dispenser for pneumatically accelerating the seeds singled out by the seed selector device along the sowing duct;
   - a pressure-varying device for varying the pressure of compressed air fed to the ejector, the pressure-varying device configured to be calibrated according to a typology of the seed to be sown; and
   - a computer and a storage unit configured to store a plurality of calibration curves of the pressure-varying device according to the typology of the seed to be sown, the computer being configured to set the pressure variation carried out by the pressure-varying device according to the calibration curves.

2. The pneumatic seed drill according to claim 1, wherein the intermediate region has a first side and a second side and the sowing duct has at least one straight portion located proximate the first side and a curved portion located proximate the second side of the intermediate region.

3. The pneumatic seed drill according to claim 2, wherein the compressed air dispenser comprises a variable-speed compressor and the pressure-varying device regulates the speed of the compressor.

4. The pneumatic seed drill according to claim 2, wherein the pressure-varying device comprises a partitioning valve located between the compressed air dispenser and the ejector.

5. The pneumatic seed drill according to claim 1, wherein the compressed air dispenser comprises a variable-speed compressor and the pressure-varying device regulates the speed of the compressor.

6. The pneumatic seed drill according to claim 1, wherein the pressure-varying device comprises a partitioning valve located between the compressed air dispenser and the ejector.

7. The pneumatic seed drill according to claim 1, wherein the compressed air dispenser is independent from the pressurization device.

8. The pneumatic seed drill according to claim 1, further comprising a measuring system for measuring the speed of forward movement of the seed drill with reference to the ground being sown in order to vary the rotational speed of the selector disc according to the speed of forward movement measured by the measuring system.

9. The pneumatic seed drill according to claim 8, wherein the pressure-varying device is calibrated according to the speed of forward movement of the seed drill measured by the measuring system.

10. The pneumatic seed drill according to claim 9, wherein the measuring system is correlated to the rotational speed of the selector disc.

11. The pneumatic seed drill according to claim 9, wherein the calibration curves of the pressure-varying device are determined according to the typology of the seed to be sown and to the speed of forward movement of the seed drill.

12. The pneumatic seed drill according to claim 8, wherein the measuring system is correlated to the rotational speed of the selector disc.

13. The pneumatic seed drill according to claim 12, wherein the calibration curves of the pressure-varying device are determined according to the typology of the seed to be sown and to the speed of forward movement of the seed drill.

14. The pneumatic seed drill according to claim 8, wherein the calibration curves of the pressure-varying device are determined according to the typology of the seed to be sown and to the speed of forward movement of the seed drill.

15. A method of regulating a precision pneumatic seed drill comprising:
   - providing a precision pneumatic seed drill including the features according to claim 6;
   - preparing a plurality of calibration curves of the pressure-varying device for varying the pressure according to a typology of the seed to be sown and to the speed of forward movement of the seed drill; and
   - calibrating the pressure-varying device during or before the sowing process according to the course described by one curve of the plurality of calibration curves according to the speed of forward movement of the seed drill measured by the measuring system.

16. A precision pneumatic seed drill for sowing seeds into the ground, the seed drill comprising:

at least one sowing element having a seed selector device housing a rotating perforated selector disc which selects the seed and has opposing faces subject to a pressure differential;

a sowing duct associated with the seed selector device and having an intermediate region located at a distance from the seed selector device;

a pressurization device associated with the selector disc and applying the pressure differential to the opposing faces of the selector disc;

a compressed air dispenser for feeding compressed air, the compressed air dispenser being independent from the pressurization device;

an ejector positioned in the intermediate region of and fed by the sowing duct and fed compressed air by the compressed air dispenser for pneumatically accelerating the seeds singled out by the seed selector device along the sowing duct;

a pressure-varying device for varying the pressure of compressed air fed to the ejector, the pressure-varying device configured to be calibrated according to the typology of the seed to be sown;

a measuring system for measuring the speed of forward movement of the seed drill with reference to the ground being sown in order to vary the rotational speed of the selector disc according to the speed of forward movement measured by the measuring system; and a computer and a storage unit configured to store a plurality of calibration curves of the pressure-varying device according to a typology of the seed to be sown, the computer being configured to set the pressure variation carried out by the pressure-varying device according to the calibration curves.

17. The pneumatic seed drill according to claim 16, wherein the intermediate region has a first side and a second side and the sowing duct has at least one straight portion located proximate the first side and a curved portion located proximate the second side of the intermediate region.

18. The pneumatic seed drill according to claim 16, wherein the compressed air dispenser comprises a variable-speed compressor and the pressure-varying device regulates the speed of the compressor.

19. The pneumatic seed drill according to claim 16, wherein the pressure-varying device comprises a partitioning valve located between the compressed air dispenser and the ejector.

20. The pneumatic seed drill according to claim 16, wherein the pressure-varying device is calibrated according to the speed of forward movement of the seed drill measured by the measuring system.

* * * * *